(12) United States Patent
Modlin

(10) Patent No.: US 7,646,804 B2
(45) Date of Patent: Jan. 12, 2010

(54) SYSTEM AND METHOD FOR IMPROVING BIT-LOADING IN DISCRETE MULTITONE-BASED DIGITAL SUBSCRIBER LINE MODEMS

(75) Inventor: Cory S. Modlin, Chevy Chase, MD (US)

(73) Assignee: Texas Instruments Incorporated, Dallas, TX (US)

( * ) Notice: Subject to any disclaimer, the term of this patent is extended or adjusted under 35 U.S.C. 154(b) by 740 days.

(21) Appl. No.: 11/028,177

(22) Filed: Jan. 3, 2005

(65) Prior Publication Data

US 2006/0146922 A1 Jul. 6, 2006

(51) Int. Cl.
*H04B 1/38* (2006.01)
(52) U.S. Cl. .................. 375/222; 375/260; 375/219
(58) Field of Classification Search .......... 375/222, 375/260, 219, 261, 265
See application file for complete search history.

(56) References Cited

U.S. PATENT DOCUMENTS

| | | | | |
|---|---|---|---|---|
| 6,134,273 A * | 10/2000 | Wu et al. | ..................... | 375/261 |
| 6,459,678 B1 * | 10/2002 | Herzberg | ..................... | 370/203 |
| 7,151,803 B1 * | 12/2006 | Sonalkar | ..................... | 375/260 |
| 2001/0030998 A1 * | 10/2001 | Yong | ..................... | 375/219 |
| 2002/0140991 A1 * | 10/2002 | Li et al. | ................. | 358/426.13 |
| 2005/0123028 A1 * | 6/2005 | Cioffi et al. | ................. | 375/222 |

OTHER PUBLICATIONS

Peter S. Chow, et al. "A Practical Discrete Multitone Transceiver Loading Algorithm for Data Transmission Over Spectrally Shaped Channels" IEEE Trans. on Communications, vol. 43, No. 2/3/4, Feb./Mar./Apr. 1995, pp. 773-775.

* cited by examiner

*Primary Examiner*—David C Payne
*Assistant Examiner*—Rahel Guarino
(74) *Attorney, Agent, or Firm*—Steven A. Shaw; W. James Brady; Frederick J. Telecky, Jr.

(57) ABSTRACT

A system and method for improving bit-loading in discrete multitone (DMT)-based digital subscriber line (DSL) modems. In one embodiment, the system includes: (1) a model generator configured to generate a model containing a calculated total bit loading for an assumed gross coding gain and estimated total bit loadings for a other plurality of assumed gross coding gains and (2) a bit loader associated with the model generator and configured to load bits in accordance with the model.

10 Claims, 1 Drawing Sheet

SYSTEM AND METHOD FOR IMPROVING BIT-LOADING IN DISCRETE MULTITONE-BASED DIGITAL SUBSCRIBER LINE MODEMS

TECHNICAL FIELD OF THE INVENTION

The present invention is directed, in general, to digital communications and, more specifically, to a system and method for improving bit-loading in discrete multitone (DMT)-based Digital Subscriber Line (DSL) modems.

BACKGROUND OF THE INVENTION

DSL is a popular way to gain broadband access to the Internet. DSL's distinct advantage over its competitors is its ability to provide such broadband access using an ordinary, twisted-pair copper telephone line, commonly referred to as a "local loop." DSL calls for a DSL modem to be located at a user's "premises" and a corresponding DSL Access Multiplexer (DSLAM) at the central office (CO) that serves the user.

DSL works by dividing the total frequency spectrum available over the telephone line into two bands: a narrow lower band consisting of frequencies of 25 kHz and below and a broad upper band consisting of frequencies above 25 kHz. The lower band is retained for conventional telephone use; the upper band provides the broadband access. DMT DSL calls for the upper band to be divided into a large number of narrowband subchannels, on the order of a few hundred subchannels to be more specific. Some of the subchannels are designated for downstream data and others for upstream data. If the number of downstream subchannels equals the number of upstream subchannels, the DSL is said to be symmetric; otherwise, it is said to be asymmetric.

DMT was selected for DSL due to its ability to react to interference. Interference occurs on a telephone line when an external event (such as lightning) creates static in the line or the signals being transmitted over the line interfere with themselves. Interference is rarely full-spectrum; instead it is often limited to a range of frequencies. While interference may impair some of the DMT subchannels, many if not most subchannels are likely to remain unaffected and available to carry signals.

DMT DSL requires that all of its subchannels be monitored for quality (typically expressed in terms of signal-to-noise ratio, or SNR). Then, an algorithm is used to allocate bits to be transmitted among the subchannels as a function of relative subchannel quality. The resulting allocation (or "loading") scheme, taking into account any user-configurable preferences, is referred to as "bit loading." Bit loading calls for more bits to be allocated to a DMT subchannel that has a higher SNR than it does to one that has a lower SNR. The DSL modem, which is at the user's premises, is responsible for measuring the SNR of the DMT subchannels, determining the bit loading and transmitting the bits accordingly. DMT DSL that dynamically changes subchannel loading is called "adaptive," because bit transmission adapts to changing subchannel conditions.

Modern DSL framing parameters include the number of bits loaded on each DMT subchannel, Reed-Solomon coding redundancy and codeword size, whether trellis coding is enabled or disabled, interleaver depth and overhead subchannel rate. The user can configure the maximum delay, the minimum overhead rate, the maximum and minimum data rate (including specifying "best possible"), the minimum impulse noise protection, the nominal and maximum PSD level and the allowable subchannel set.

Unfortunately, no straightforward way exists to select the modem framing parameters to optimize globally for all input parameters. This problem is conventionally solved through an algorithm that searches over a variety of input parameter settings. For example, the algorithm might search over trellis code enabled and disabled, varying Reed-Solomon redundancy values, and a range of gross coding gains.

Subchannel coding gain is the effective increase in subchannel gain that results purely from the coding scheme applied to information transmitted over a given subchannel; gross coding gain is the sum of all subchannel coding gains. the higher the gross coding gain, the more bits can be loaded on each DMT subchannel. However, higher coding gains typically require more coding redundancy to achieve which may or may not result in a higher overall data rate (or more impulse noise protection or a higher or lower delay depending on the particular values of the user-configurable parameters).

What is needed in the art is a way to estimate modem framing parameters globally for at least a subset of input parameters so that the overall net data rate of a DMT DSL modem is increased. More specifically, what is needed in the art is a way to estimate modem framing parameters globally for all input parameters such that errors in estimation are reduced, and most advantageously minimized, over a wide range of operating conditions.

SUMMARY OF THE INVENTION

To address the above-discussed deficiencies of the prior art, the present invention introduces a way to estimate the number of bits loaded onto each DMT subchannel as the gross coding gain changes. The only exact way to estimate this is to run an algorithm known as "bit loading" over all subchannels. Because bit loading is computationally intensive, the present invention provides a way to run bit loading only once at some initial gross coding gain but maintains an accurate estimate of the bit loading over a range of gross coding gains.

In one aspect, the present invention provides a system for improving bit-loading in DMT-based DSL modems. In one embodiment, the system includes: (1) a model generator configured to generate a model containing a calculated total bit loading for an assumed gross coding gain and estimated total bit loadings for a other plurality of assumed gross coding gains and (2) a bit loader associated with the model generator and configured to load bits in accordance with the model. For purposes of the present invention, an "occupied subchannel" is a subchannel to which is allocated at least one bit.

In another aspect, the present invention provides a method of improving bit-loading in a DMT-based DSL modem. In one embodiment, the method includes: (1) generating a model containing a calculated total bit loading for an assumed gross coding gain and estimated total bit loadings for a other plurality of assumed gross coding gains and (2) loading bits in accordance with the model.

In yet another aspect, the present invention provides a system for bit-loading in a DMT-based DSL modem. In one embodiment, the system includes: (1) a model generator configured to generate a model containing a calculated total bit loading for an assumed gross coding gain and estimated numbers of one-bit subchannels for a other plurality of assumed gross coding gains and (2) a bit loader associated with the model generator and configured to load bits in accordance with the model.

In still another aspect, the present invention provides a method of bit-loading in a DMT-based DSL modem. In one embodiment, the system includes: (1) generating a model containing a calculated total bit loading for an assumed gross coding gain and estimated numbers of one-bit subchannels for a other plurality of assumed gross coding gains and (2) loading bits in accordance with the model.

In still yet another aspect, the present invention provides a system for bit-loading in a DMT-based DSL modem. In one embodiment, the system includes: (1) a model generator configured to generate a model containing a calculated total bit loading for an assumed gross coding gain and estimated numbers of occupied subchannels for a other plurality of assumed gross coding gains and (2) a bit loader associated with the model generator and configured to load bits in accordance with the model. For purposes of the present invention, an "occupied subchannel" is a subchannel to which is allocated at least one bit.

In yet still another aspect, the present invention provides a method of bit-loading in a DMT-based DSL modem. In one embodiment, the system includes: (1) generating a model containing a calculated total bit loading for an assumed gross coding gain and estimated numbers of occupied subchannels for a other plurality of assumed gross coding gains and (2) loading bits in accordance with the model.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
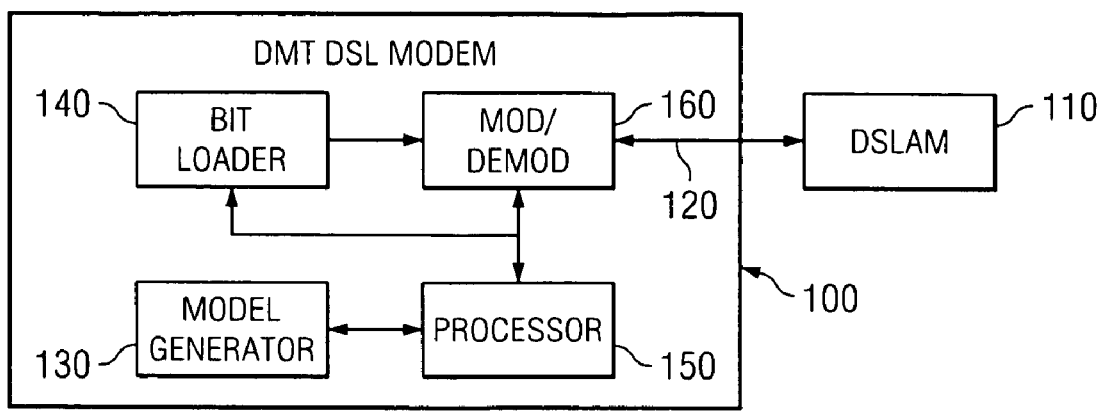
FIG. 1 illustrates a block diagram of a DSL line, a DMT-based DSL modem and one embodiment of an associated system for improving bit-loading in the DMT-based DSL modem constructed according to the principles of the present invention.

Referring initially to FIG. 1, illustrated is a block diagram of a DSL line, a DMT-based DSL modem and one embodiment of an associated system for improving bit-loading in the DMT-based DSL modem constructed according to the principles of the present invention.

The DMT-based DSL modem, designated 100, is a rate-adaptive modem and is coupled to a DSLAM 110 via a telephone line 120. The modem 100 is illustrated as including a model generator 130, bit loader 140, a processor 150 and a modulator/demodulator 160.

The model generator 130 is configured to generate a model. The model contains estimated numbers of occupied and bit-capped DMT subchannels for a other plurality of assumed gross coding gains and associated assumed input parameters. From these estimated numbers, resulting estimated total bit loadings are calculated for the other plurality of assumed gross coding gains and associated assumed input parameters. An exemplary way in which the model generator 130 is configured to generate this model will be set forth in greater detail in conjunction with FIG. 2.

The bit loader 140 is associated with the model generator 130. The bit loader 140 is configured to load bits in accordance with the model so as to increase the overall net data rate of the DMT DSL modem 100. In the exemplary embodiment of FIG. 1, the model generator 130 takes the form of a sequence of software instructions executable in the processor 150. Of course, the model generator 130 may take the form of hardwired circuitry or firmware, as appropriate to a particular application. As stated above, the bit loader 140 loads bits in accordance with the model. In the specific embodiment of FIG. 1, the bit loader 140 loads the bits into a modulator portion of the modulator/demodulator 160 for transmission over the telephone wire 120. Bits received from the DSLAM 110 via the telephone wire 120 are demodulated in a demodulator portion of the modulator/demodulator 160 and delivered to the processor 150 for further use. Those skilled in the pertinent art are familiar with the structure and operation of processors and modulator/demodulators suitable for use in a DMT DSL modem.

As stated above, the present invention deals with estimating the number of bits loaded onto each DMT subchannel as the gross coding gain changes. The only exact way to estimate this is to run an algorithm known as "bit loading" over all DMT subchannels. Because bit loading is computationally intensive, the present invention provides a way to run bit loading only once at some initial gross coding gain but maintains an accurate estimate of the bit loading over a range of gross coding gains.

The illustrated embodiment of the rate-adaptive DMT DSL modem 100 loops through all possible subchannel coding gains to find the one that yields the highest net data rate. The range of subchannel coding gains is approximately 10 dB, and the step size used in the current version of rate adaptation is such that many different subchannel coding gains are tested.

For each subchannel coding gain, the number of bits loaded per DMT subchannel should be estimated under the assumption that increasing the gain increases the SNR. The number of DMT subchannels loaded with only one bit and those with more than one bit should also be estimated, because the number of trellis-coded bits is calculated differently for one-bit subchannels and subchannels with more than one bit.

One could in theory execute a bit loading algorithm (e.g., the well-known Chow bit loading algorithm (see, Chow, et al., "A Practical Discrete Multitone Transceiver Loading Algorithm for Data Transmission over Spectrally Shaped Subchannels," IEEE Trans on Communications, Vol. 43, No 2/3/4, pp. 773-775, February/March/April 1995, incorporated herein by reference) for each new subchannel coding gain value. The bit loading algorithm would go through each subchannel and assign bits according to the SNR level, margin and assumed subchannel coding gain. However, running the algorithm for each subchannel coding gain is not practical given the constraints on computation time, especially in the downstream direction, which has many subchannels.

Estimating the number of bits per subchannel is a reasonable way to address the problem. The bit loading algorithm could be run at a certain subchannel coding gain and estimates for other additional bits at other subchannel coding gains could be extrapolated.

For example, it is known that the number of bits loaded on each subchannel also increases by about one bit for every 3 dB as the subchannel coding gain increases. However, the number of subchannels carrying bits could increase. Furthermore, some subchannels could become bit-capped or limited by the maximum number of bits per subchannel allowed by standard (typically 15 bits). The challenges facing this approach are that the 3 dB/bit/subchannel approximation does not hold very well for small symbol constellations, estimating the number of new subchannels is difficult, and keeping track of bit-capped subchannels could mean going through each subchannel individually or estimating this also.

One possible implementation could estimate the number of bits and subchannels at other gross coding gains after an initial bit loading at some initial gross coding gain. The number of subchannels is estimated by making some assumptions about the characteristics of the SNR and what the number of additional subchannels might be at a given increase in subchannel coding gain. Then the number of bits per symbol is estimated by assuming 3 dB/bit/subchannel using the estimated number of subchannels.

In the upstream direction in ADSL Annex A and B, where only up to 26 subchannels exist, this method will work well for a majority of cases. However, it is clear that if the SNR is not shaped in the way expected, the estimate will be inaccurate. If the SNR is flatter than expected, a small increase in subchannel coding gain could result in a large increase in the number of supported subchannels. And, as the subchannel coding gain grows further from the value used in the initial bit loading, the estimate becomes increasingly less accurate.

In the downstream direction, where up to 512 subchannels in ADSL2+ may exist, this approximation will not generally be accurate. For subchannel coding gain values far from the one used in the initial bit loading, the error can be significant.

If the estimate of the number of bits loaded at a certain current subchannel coding gain is too high, then, in later stages of rate adaptation when the exact number of bits is loaded, the margin drops below the targeted value. Similarly, if the number of bits is too low, a lower data rate is being used than is achievable. Since operators test the margin, any inaccuracy in this estimate is like a loss in SNR. If the inaccuracy of the estimate normally changes the margin by ±1 dB, 1 dB needs to be added to the design margin to ensure that the final margin does not drop to an unacceptable level.

Adding to the difficulty, the number of trellis-coded bits depends on the number of one-bit constellations. Using a method of estimating the number of loaded subchannels, the number of one-bit subchannels can also be estimated. But this estimate will contain errors. If there are a lot of one-bit subchannels, the errors can be significant.

The present invention, in contrast, introduces a more accurate approximation to the number of loaded bits and subchannels. This improved approximation uses the exact number of loaded subchannels and accounts for subchannels that are bit cap limited (for which the number of bits would otherwise exceed the maximum bit count per subchannel, or "BIMAX").

Based on the output of the single bit loading, three arrays are computed, indexed by the subchannel coding gain. The granularity of the subchannel coding gain and the size of the arrays are defined constants. In the current code, the size of the three arrays is 192, and the granularity is $16/256*10*\log 10\,(2)=0.1881$ dB, making the total range of the arrays $192*0.1881 \approx 36$ dB. The three arrays indicate the number of loaded subchannels, the number of one bit subchannels for use in estimating the number of trellis bits and the total number of loaded bits, all at the indexed gross coding gain.

Computing the three arrays requires one additional pass through all subchannels (in addition to the first pass, which is a bit loading algorithm, such as the above-referenced Chow bit loading algorithm) followed by a computation stage that requires one pass through every array index. This computation is done after bitloading and before looping through all subchannel coding gains.

The illustrated embodiment of the algorithm of the present invention begins by computing three threshold values. The first two threshold values are the minimum SNR the bitloading algorithm would use to load BIMIN(1) bits and 2 bits (BIMIN being the minimum bit count per subchannel). Typically the threshold is about 1.5 dB below the SNR required to support exactly BIMIN or 2 bits, but the thresholds are computed in a table; the 1.5 dB approximation is not used.

The third threshold is exactly the SNR required to support BIMAX=15 bits. The reason the threshold for BIMAX is at the SNR level required to load BIMAX bits, and not BIMAX+0.5 bits, will be explained shortly.

The SNR thresholds use pre-computed values that are based on the calculated energy of each constellation. The desired margin and assumed subchannel coding gain are included in the input variable "gapdB."

With the three thresholds, the algorithm cycles through each subchannel. For each subchannel, the additional SNR required to reach the threshold is calculated. In some cases, the additional SNR might be negative. If the additional SNR is positive, with additional gain (or subchannel coding gain) equal to the amount of additional SNR required, the respective number of bits could be loaded. The additional amount of gain is quantized to some index value. For example, if 4 dB additional gain is required to load 2 bits, assuming the granularity of indexed values is 0.1881 dB, the index would be equal to $\mathrm{round}(4/0.1881)=21$.

Three temporary arrays are initialized to all zeros. At a given SNR index value, the arrays represent the number of subchannels that: (1) start to have nonzero bits loaded (nloaded), (2) start to carry at least 2 bits (nonebit) and (3) become bit cap limited (nnocap).

For example, if 4 dB additional gain is required to load two bits corresponding with an index 21, 1 dB is required to load one bit corresponding to an index 5, and 46 dB (index 390) is required to reach the bit cap, then nloaded(5) would be incremented by one, since a 1 dB gain is required to load a bit onto a subchannel and nonebit(21) would be incremented by one. nnocap would not change, since index 390 exceeds the length of the arrays.

While looping through the subchannels, the number of subchannels, at the initial subchannel coding gain level, that carry no bits, less than 2 bits, and are not bit cap limited are tracked. So far, the complexity of the algorithm is on the order of the number of subchannels (similar to bit loading itself).

With the arrays, a new set of arrays can be computed that, at a given subchannel coding gain level, contain: (1) the number of subchannels with bits loaded (nloaded), (2) the number of subchannels with one bit loaded (nonebit) and (3) the number of subchannels that are not bit-capped but carry bits (nnocap).

The same arrays are used to store this information to save storage space. Each array is initialized as: (1) loaded(0)=the total number of subchannels minus the number of subchannels with zero bits, (2) nonebit(0)=the number of subchannels with less than two bits minus the number of subchannels with zero bits and (3) nnocap(0)=the number of subchannels that are not bit cap limited minus the number of subchannels with zero bits.

Then a loop over the length of the array is executed, noting that:

$$nonebit(i)=nonebit(i-1)+nloaded(i)-nonebit(i) \quad (1)$$

$$nnocap(i)=nnocap(i-1)+nnocap(i)+nloaded(i) \quad (2)$$

$$nloaded(i)=nloaded(i-1)+nloaded(i) \quad (3)$$

Equation (1) states that the number of subchannels with loaded bits at index i is the number of subchannels with one bit at index i–1 plus the number of subchannels that have one bit loaded at index i minus the number of subchannels that no longer have one bit loaded at this higher gain. Equations (2) and (3) are similar in structure. Note that nonebit(i) on the right side of the equation is the old value, while the new value is on the left side.

Finally, a second loop over the array length is performed to find the number of loaded bits at a given subchannel coding gain. A 3 dB/bit/subchannel approximation is used. It is found that the number of loaded bits at index i is the number of loaded bits at index i–1+nloaded(i)*0.1881/3. The 3 dB/bit/subchannel approximation means that the estimated number of loaded bits loses some accuracy when many subchannels are loaded with 1, 2 and 3 bits. The second two loops are on the order of the array size in complexity.

The number of loaded subchannels and the number of one bit subchannels are not approximations; they correspond exactly to what bit loading would give at the same gross coding gain. The number of bits loaded at a given subchannel coding gain is, however, an approximation based on the 3 dB/bit/subchannel approximation. But since the number of loaded subchannels is exactly what full bit loading would predict, the estimated number of loaded bits will be very accurate.

The size of the arrays is influenced not only by the possible range of gross coding gain, but also by the desire to reduce excess margin. On short channels with high SNR, even at the highest rates, the margin can be well in excess of the required margin. In this case, it is desirable to reduce the transmit power. The amount by which the transmit power is reduced can be determined using the arrays.

Since the illustrated embodiment of the algorithm of the present invention is referenced to the last time bit loading was called, when the arrays are indexed by 0 (zero), this is normally the number of bits and subchannels that were loaded during bit loading. However, sometimes it is useful to estimate the number of bits at a subchannel coding gain that is below the level used during the previous bit loading. For this reason, an "offset" is included in the algorithm. Instead of 0, when the arrays are indexed by the offset, this is the reference subchannel coding gain used by the previous bit loading. If the offset is greater than 0, the index 0 is actually an estimate of the bits and subchannels loaded at a subchannel coding gain that is offset lower than the one used during the previous bit loading.

Figure 2:
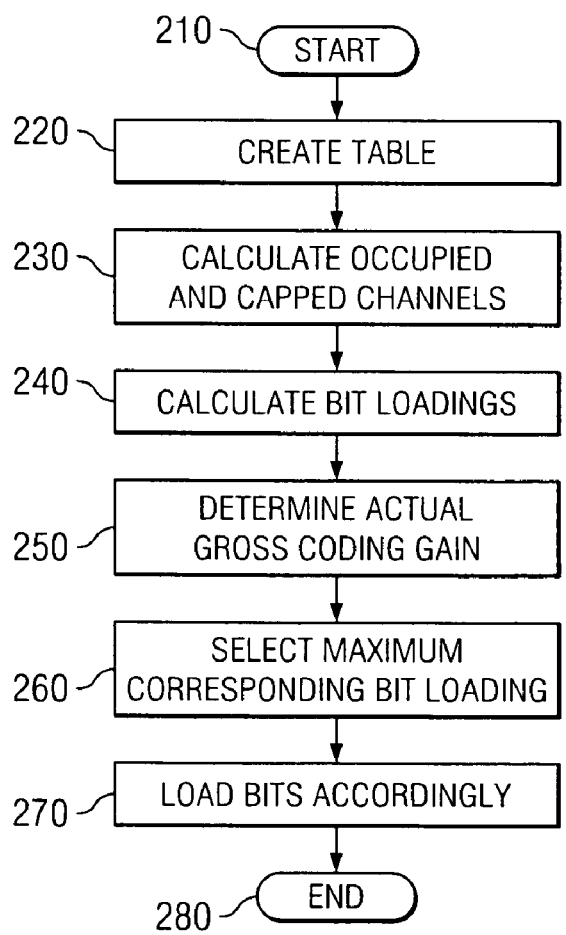
FIG. 2 illustrates a flow diagram of one embodiment of a method of improving bit-loading in a DMT-based DSL modem carried out according to the principles of the present invention.

Turning now to FIG. 2, illustrated is a flow diagram of one embodiment of a method of improving bit-loading in a DMT-based DSL modem carried out according to the principles of the present invention.

The method begins in a start step 210 in which it is desired to improve bit-loading. The method proceeds to a step 220 in which a table is created. In one embodiment of the present invention, three tables are built, indexed by gross coding gain. Of course, methods that do not involve tables fall within the broad scope of the present invention.

Next, in a step 230, occupied and bit-capped DMT subchannels are calculated for that gross coding gain. Step 230 may be performed by a conventional bit loading algorithm, such as the Chow algorithm referenced above. Then in a step 240, resulting total bit loadings for each gross coding gain are calculated. In this manner, a suitable model is generated for use.

Next, in a step 250, actual gross coding gain is determined under operating conditions (typically by monitoring subchannel SNR). Then in a step 260, the model is consulted to determine the bit loading corresponding to that actual gross coding gain that offers a superior (and most preferably maximum) net data rate. In a step 270, that bit loading is employed to load bits. The method end in an end step 280.

Although the present invention has been described in detail, those skilled in the art should understand that they can make various changes, substitutions and alterations herein without departing from the spirit and scope of the invention in its broadest form.

What is claimed is:

1. A system for bit-loading in a discrete multitone (DMT)-based digital subscriber line (DSL) modem, comprising:
    a model generator configured to generate a model containing a calculated total loading for an assumed gross coding gain and estimated total bit loadings for a plurality of other assumed gross coding gains, wherein said model generator estimates said estimated total bit loadings by adding a total numbers of estimated bits loaded on all subchannels at said assumed gross coding gains by taking one-bit loading at one coding gain and estimating total bit loadings at said assumed gross coding gains and said total numbers of estimated bits loaded on all subchannels depends upon signal-to-noise ratios, bit caps and numbers of unloaded subchannels, wherein said model generator pre-computes three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and
    a bit loader associated with said model generator and configured to load bits in accordance with said model.

2. A method of bit-loading in a discrete multitone (DMT)-based digital subscriber line (DSL) modem, comprising:
    generating a model containing a calculated total bit loading for an assumed gross coding gain and estimated total bit loadings for a other plurality of assumed gross coding gains by estimating said estimated total bit loadings by adding a total numbers of estimated bits loaded on all subchannels at said assumed gross coding gains by taking one-bit loading at one coding gain and estimating total bit loadings at said assumed gross coding gains and said total numbers of estimated bits loaded on all subchannels depends upon signal-to-noise ratios, bit caps and numbers of unloaded subchannels;
    pre-computing three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and
    loading bits in accordance with said model.

3. A system for bit-loading in a discrete multitone (DMT)-based digital subscriber line (DSL) modem, comprising:
    a model generator configured to generate a model containing a calculated total bit loading for an assumed gross coding gain and estimated numbers of one-bit subchannels for a other plurality of assumed gross coding gains, wherein said model generator pre-computes three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and a bit loader associated with said model generator and configured to load bits in accordance with said model.

4. The system as recited in claim 3, wherein said numbers of one-bit subchannels depend upon signal-to-noise ratios, bit caps and numbers of unloaded subchannels.

5. A method of bit-loading in a discrete multitone (DMT)-based digital subscriber line (DSL) modem, comprising:

generating a model containing a calculated total bit loading for an assumed gross coding gain and estimated numbers of one-bit subchannels for a other plurality of assumed gross coding gains, wherein said generating comprises pre-computing three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and loading bits in accordance with said model.

6. The method as recited in claim 5 wherein said numbers of one-bit subchannels depend upon signal-to-noise ratios, bit caps and numbers of unloaded subchannels.

7. A system for bit-loading in a discrete multitone (DMT)-based digital subscriber line (DSL) modem, comprising:

a model generator configured to generate a model containing a calculated total bit loading for an assumed gross coding gain and estimated numbers of occupied subchannels for a other plurality of assumed gross coding gains, wherein said model generator estimates said estimated numbers of occupied subchannels by adding a total numbers of occupied subchannels at said assumed gross coding gains, wherein said model generator pre-computes three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and a bit loader associated with said model generator and configured to load bits in accordance with said model.

8. The system as recited in claim 7 wherein said numbers of occupied subchannels depend upon signal-to-noise ratios, bit caps and numbers of unloaded subchannels.

9. A method of bit-loading in a discrete multitone (DMT)-based digital subscriber line (DSL) modem, comprising:

generating a model containing a calculated total bit loading for an assumed gross coding gain and estimated numbers of occupied subchannels for a other plurality of assumed gross coding gains, wherein said generating comprises estimating said estimated numbers of occupied subchannels by adding a total numbers of occupied subchannels at said assumed gross coding gains comprising pre-computing three threshold arrays subscripted by said assumed gross coding gains based on an output of a single-bit loading, wherein the three arrays represent a number of loaded subchannels, a number of one bit subchannels for use in estimating a number of trellis bits, and a total number of loaded bits, all at the indexed gross coding gain; and loading bits in accordance with said model.

10. The method as recited in claim 9 wherein said numbers of occupied subchannels depend upon signal-to-noise ratios, bit caps and numbers of unloaded subchannels.

* * * * *

UNITED STATES PATENT AND TRADEMARK OFFICE
CERTIFICATE OF CORRECTION

PATENT NO.       : 7,646,804 B2　　　　　　　　　　　　　　　　　　　　　　　　　Page 1 of 1
APPLICATION NO. : 11/028177
DATED            : January 12, 2010
INVENTOR(S)      : Cory S. Modlin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1348 days.

Signed and Sealed this

Twenty-eighth Day of December, 2010

David J. Kappos
*Director of the United States Patent and Trademark Office*